Patented July 10, 1945

2,379,939

UNITED STATES PATENT OFFICE 2,379,939

RUBBER TO METAL ADHESIVE AND METHOD OF MAKING SAME

Roy M. Vance and Clement A. Damicone, Akron, Ohio, assignors to The General Tire & Rubber Company, Akron, Ohio, a corporation of Ohio No Drawing. Application September 4, 1942, Serial No. 457,328

4 Claims. (Cl. 260—769)

This invention relates to rubber derivatives and to a method of preparing the same. It particularly relates to an improved adhesive for adhering rubber to metal.

Co-pending applications of Thomas Raymond Griffith, Serial No. 277,086, filed June 2, 1939, and Serial Nos. 292,699 and 292,700, filed August 30, 1939, disclose methods of preparing rubber derivatives of the cyclized type having less unsaturation than rubber, but having the same carbon-to-hydrogen ratio as rubber. In accordance with the methods disclosed in these Griffith applications, a rubber conversion or cyclizing agent consisting of a normal or acid salt of a strong acid, a weak acidic substance and water, with or without sulphur, is mixed into rubber. This mixture is heated in a form having thin section to produce a reaction product having less plasticity than rubber at elevated temperatures. The reaction product thus prepared when masticated and dissolved in rubber solvent is a desirable adhesive for bonding rubber to metal.

In the commercial manufacture of rubber derivatives in accordance with the processes set forth in the above Griffith applications, we have found that different batches of adhesives prepared according to same formulae have variable properties. Some batches tend to gel in containers after a relatively short standing period; and others when used in composite articles bond the rubber to the metal with varying strengths.

It is an object of the present invention to provide a method of producing rubber derivatives or rubber isomers capable of bonding rubber to metal wherein separate batches have substantially identical properties.

It is a further object of the present invention to provide a rubber isomer or rubber derivative of uniform properties and capable of bonding rubber to metal with great strength at both normal and elevated temperatures.

It is a still further object of the present invention to produce composite articles of rubber and metal wherein the rubber is always bonded to the metal with high strength.

I have found that these and other objects, which will be apparent from the following detailed description of the invention, are accomplished by forming a mixture of a rubber, a weak acidic material or material which with water forms a weak acid, a small amount of a strong mineral acid such as concentrated sulphuric acid and an alum, such as potassium or alkali metal alums, which contain large amounts of water of crystallization. This mixture is shaped into a form having relatively thin section, heated to cause formation of an exothermic reaction product, and the product masticated to render it soluble in rubber solvents. In order to increase age resistance and heat resistance, it is also desirable to add a small amount of sulphur or selenium, or both, to the rubber or mixture prior to the reaction.

We are of course aware of the disclosure in the above mentioned Griffith applications to the effect that alums in conjunction with a weak acid such as phosphoric anhydride may be used in place of the aluminum acid sulfate $P_2O_5$ and water in forming desirable rubber derivatives. We are not aware of any disclosure however which discloses the proportion of alums and $P_2O_5$ which we have, as hereinafter more fully described, found to produce a more uniform and more desirable product. Neither are we aware of any disclosure of the use of a conversion or cyclizing agent comprising a small amount of a strong mineral acid, particularly sulfuric acid in addition to an alum and weak acidic ingredients. We have found that a small amount of the strong acid further improves the characteristics of the rubber derivative.

We have also concluded from the results of our experiments that it is undesirable to add water, as water, to the rubber for the reason that the starting period of the reaction does not appear to be controllable when water is added in this manner. When all of the water is added as water of crystallization in a compound such as alum, which tightly bonds the water in chemical combination, the water is released at a definite temperature and the cyclizing reaction appears to commence at a definite temperature so that duplicative results are obtainable.

The alums which are found to be desirable for use in accordance with the present invention are any of those double salts containing twenty-four molecules of water in the molecular formula. The alkali metal alums, particularly potassium alum and sodium alum having the respective formulae

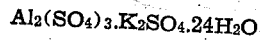

and

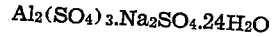

are preferred, although other alums such as potassium chrome, potassium manganese, potassium iron, ammonium iron, etc., also may be used.

The hardness of the conversion product or the rubber derivative depends in large measure on the amount of the conversion reagent present in the mix. With larger quantities of alum, harder mixes are obtained. For the preparation of a cyclized derivative of rubber suitable as a base for rubber-to-metal adhesive, at least fifteen parts (by weight) of alum for each one hundred parts of rubber appears to be necessary. With less than fifteen parts, the material is much too soft to bond with any strength. When more than thirty parts of alum are present in the mix, the product becomes so hard that the adhesion of rubber to metal is inefficient. For rubber-to-metal adhesives suitable for bonding rubber to metal with a single coat, and for producing the strongest bonds, the alum should usually be present in amounts between 18 and 25 parts for each one hundred parts of rubber.

A substance such as phosphorus pentoxide (phosphoric anhydride), which with water forms a weak acid, is preferred for the weak acid constituent of the conversion or cyclizing agent. The amount of phosphorus pentoxide is less than the amount of alum and the preferred amount varies substantially with the amount of sulphuric acid present. With very small amounts or no sulphuric acid present, the amount of phosphorus pentoxide may be as much as about eight parts for each one hundred parts of rubber. When the amount of sulphuric acid is increased, the desirable amount of phosphorus pentoxide should be decreased but at least two or three parts is always desirable and about three to five parts are preferred for each one hundred parts of rubber.

Although a reaction product with good properties may be produced without the addition of any sulphuric acid, a small amount of sulphuric acid improves the characteristics and uniformity of the product for adhesives. It also permits the use of less phosphorus pentoxide than is otherwise necessary to produce a reaction product of the desired hardness for composite articles of rubber and metal. As little as .2% or .3% of concentrated sulphuric acid is effective in improving the reaction mix; more than four or five parts of sulphuric acid has an undesirable effect on the character of the conversion or cyclized product. The sulphuric acid should preferably be less than the amount of weak acid anhydride and between about 1% and about 3% of the weight of the rubber is most desirable.

The mixture of rubber and conversion reagents, with or without the addition of up to 3% sulphur, is preferably formed in a relatively thin section not substantially exceeding one-half inch and preferably less than one-fourth inch in thickness. The formation of the mixture in thin section is beneficial in facilitating the exothermic reaction and the time necessary for a complete reaction decreases as the thickness of the reaction product is decreased. When the thickness of the mixture is substantially over one-fourth inch or so in thickness, the complete reaction takes place with considerable difficulty.

The conditions during the heating period considerably affect the character of the exothermic reaction product. If the temperature of the mixture rises too high, the reaction product will be adversely affected; if the temperature is not sufficiently high or the time of heating is too short, the reaction does not appear to become completed and the product is also adversely affected. When the mixture has a thickness of about one-eighth inch to one-fourth inch, I have found that an especially desirable product is obtained with a heating period of about one and a half to two hours at 300° F. oven temperature. The reaction being exothermic, the temperature in the reaction mix may rise to about 325° F. or so. The oven temperatures should preferably be held between about 270° F. and 325° F. for best results. It is preferred to heat the mixture in an atmosphere having less oxygen pressure than the partial pressure of oxygen in the air, such as obtained with an inert gas or a vacuum. Ordinarily, a vacuum of about ten inches to twenty-four inches of mercury is most desirable. As the pressure in the oven is decreased, below atmospheric pressure, the reaction time is increased and the uniformity of the product is increased. With a pressure of less than 20 or 22 inches of mercury, formation of surface coatings of undesirable characteristics are substantially eliminated.

In the preparation of rubber-to-metal adhesives or reaction product prepared as above described, the reaction product is masticated sufficiently to render it soluble in rubber solvents. Preferably during the mastication, the reaction product is suitably compounded with one or more ingredients capable of neutralizing any acidic residue in the reaction product. An antioxidant and reinforcing pigment such as carbon black together with an accelerator is also preferably incorporated during the mastication step. When the mixture is masticated sufficiently so that it is soluble, it is preferably immediately dissolved or dispersed in sufficient rubber solvent to obtain a cement of the desired consistency. Petroleum rubber solvents, such as gasoline containing about 3% to 5% butyl alcohol, are usually preferred, but aromatic solvents such as benzol (benzene) or mixtures containing aromatic rubber solvents also may be used.

In the T. R. Griffith application Serial No. 353,914, filed August 23, 1940, there is set forth a rubber-to-metal adhesive containing sulphur and/or other vulcanizing agents such as selenium and tellurium added to the solution of dissolved derivatives. We have also found that in the preparation of rubber-to-metal adhesives of derivatives of the present invention, additions of sulphur to the solution is desirable in improving heat resistance of the product in the same manner as set forth in the above Griffith application. At least 5% of sulphur, or equivalent vulcanizing agents, preferably are added to the solution of the derivative. Best results are usually obtainable with 10 or 15% of sulphur based upon the weight of the cyclized derivative. Even more than 20% of sulphur may, however, be present in the adhesive without decreasing the strength of the bond. It is preferable to maintain the percentage below about 50% of sulphur.

The type of accelerator used in the adhesive is important in obtaining high bonding strength. Those accelerators which exert a stiffening or anti-plasticizing effect on solid rubber mixes are preferred. Such accelerators usually have one or more primary amino groups. Those having a plurality of primary amino groups, such for example as 2,4 diaminodiphenylamine, are especially desirable. The antioxidant should also preferably be of a type which produces a stiffening action on the rubber. Examples of desirable antioxidants are those of the Neozone series and condensation products of acetone and aniline sold under the trade name "Flechtol H." However, other antioxidants may also be used.

The following examples illustrate the present invention:

*Example 1*

| | Parts by weight |
|---|---|
| Rubber, masticated smoked sheets (or equivalent) | 100 |
| Potassium alum | 20 |
| Phosphorus pentoxide | 4 |
| Concentrated sulphuric acid | 1½ |
| Sulphur | 1 |
| Selenium | 3 |

The above ingredients were suitably mixed on a rubber mill, and formed in a shape having thin section, such as 1/8" and 1/4" or so. The thin sheets were then heated in a vacuum oven at about 20 inches of mercury and at about 300° F. for ninety minutes to procure a reaction product.

The sheets were spaced during the heating period to provide adequate circulation of air in the oven. The reaction product was a rubber derivative which had less plasticity than crude rubber at 120° C., it had the same carbon-to-hydrogen ratio as rubber but had less chemical unsaturation than a rubber addition product of the same chemical formula, thus indicating cyclization of the derivative, and indicating that the reagent is, with the aid of heat, a cyclizing agent for rubber.

*Example 2*

| | Parts by weight |
|---|---|
| Reaction product of Example 1 | 100 |
| Antioxidant (condensation product of acetone and aniline) | 2 |
| Magnesium oxide | 15 |
| Zinc oxide | 30 |
| Carbon black ($P_{33}$) | 15 |
| Red iron oxide ($Fe_3O_4$) | 10 |
| Accelerator (2,4 diaminodiphenylamine) | 2 |

The above ingredients were mixed on a mill and mastication continued until the rubber derivative was solubilized. 174 parts of the masticated product were then dissolved in gasoline containing 3% of butyl alcohol in the ratio of one pound of masticated material for each gallon of solvent. 10.5 parts of sulphur and 3.5 parts of selenium were then thoroughly mixed into the solution to produce a rubber-to-metal adhesive.

Composite articles of rubber and metal were made using the rubber-to-metal adhesive above prepared. The articles were made by applying a single coat of adhesive to a clean surface of the metal, allowing it to dry and then vulcanizing a suitable curable compounded rubber against the coated surface under heat and pressure. The articles were removed from the mold without cooling the mold and when they were tested at room temperature the tensile strength of the bond between the rubber and metal was about 830 lbs. per sq. in.

When in the above Example 1 the sulphuric acid was omitted and the reaction product otherwise identically prepared, products produced with the cement prepared in accordance with Example 2 had a tensile strength of only 180 lbs. per sq. in. However, when the amount of phosphorus pentoxide was increased to 6%, sulphuric acid also being omitted, composite articles prepared had a bonding strength of 600 lbs. per sq. in. When the sulphuric acid was omitted and the amount of phosphorus pentoxide was increased to eight pounds, the composite articles prepared had a bonded strength of only 260 lbs. per sq. in. When in above Example 1 the amount of alum is reduced to 15 parts, the product becomes so soft that the bond between the rubber and metal has but a little strength. On the other hand, when the amount of alum is increased to more than 30 parts, the resin becomes so hard that the strength of the bond is reduced below usable value.

The sulphur and/or selenium may be omitted from Example 1 to produce a cyclized hydrocarbon rubber derivative or rubber isomer. The hydrocarbon product thus produced has lower heat resistance and slightly inferior aging properties than the products produced in accordance with Example 1. When the sulphur and selenium are omitted from the solution of the derivative, the strength of the bond is usually somewhat decreased when subjected to high temperatures.

An even stronger bond than that disclosed above may be obtained if a suitable tie cement is applied to the rubber-to-metal adhesive on the metal so that the tie cement is between the rubber-to-metal adhesive and the rubber to be bonded to the metal. The tie cement should preferably have as its solid organic base about equal parts of the compounded rubber derivative and the rubber compound. Other proportions of these are sometimes desirable. A tie cement is usually unnecessary to obtain bonds of sufficient strength for most applications.

While slightly masticated smoked sheet rubber or its equivalent is generally used in the preparation of rubber-to-metal adhesives, it is understood that one may use other types of rubbers, even synthetic rubbers of the types which have unsaturated structures similar to those of natural rubbers, and which will undergo a polymerizing or cyclizing reaction to produce solubilizable products having less unsaturation than the raw materials when the raw material is chemically combined with an equivalent amount of added elements.

While the vulcanizing agents, sulphur and selenium, have been mainly emphasized throughout the specification, it is to be understood that tellurium, and even vulcanizing types of accelerators, such as tetramethylthiuram disulphide, etc., may be used.

In the appended claims, the term "rubber" unless specifically qualified is intended to include synthetic rubbers as well as natural rubber, and the term "rubber derivative" is intended to include derivatives of natural and the synthetic rubbers which form soluble rubber derivatives when treated with the conversion reagents, heated and masticated as above described, such synthetic rubbers being generally those vulcanizing or combining chemically with sulphur.

It is to be understood that variations and modifications of the procedure herein shown and described for purposes of illustration may be made without departing from the spirit of the invention.

What we claim is:

1. A method of producing rubber derivatives of the cyclized type, as evidenced by having the same carbon-to-hydrogen ratio as rubber and having less chemical unsaturation than rubber and unsaturated rubber addition products of the same percentage composition, which comprises forming a mixture of rubber, an alkali metal alum, phosphorus pentoxide and free sulphuric acid, and heating the mixture to procure an exothermic reaction product, said alum being present in the mix in amounts between about 15 parts and about 30 parts for each 100 parts of rubber, the amount of said phosphorus pentoxide being between 2 parts and 8 parts for each 100 parts of rubber, said sulphuric acid being present in amounts of .2 to 5 parts for each 100 parts of rubber.

2. A method of producing rubber derivatives of the cyclized type, as evidenced by having the same carbon-to-hydrogen ratio as rubber and having less chemical unsaturation than rubber and unsaturated rubber addition products of the same percentage composition, which comprises forming a mixture of rubber, an alkali metal alum, phosphorus pentoxide, a vulcanizing agent and free sulphuric acid, and heating the mixture to procure an exothermic reaction product, said alum being present in the mix in amounts between about 15 parts and about 30 parts for each 100 parts of rubber, the amount of said phosphorus pentoxide being between 2 parts and 8 parts for each 100 parts of rubber, said sulphuric acid being present in amounts of .2 to 5 parts for each 100 parts of rubber.

3. The method of claim 1 wherein the amount of sulphuric acid is 1 to 3 parts for each 100 parts of rubber and wherein said mixture is heated in an inert atmosphere to procure said reaction product.

4. The method of claim 1 wherein said mixture is heated in a form having thin section at a temperature between 270° F. and 325° F. and in an atmosphere having less oxygen pressure than the partial pressure of oxygen in the atmosphere.

ROY M. VANCE.
CLEMENT A. DAMICONE.